July 14, 1936.        T. B. PRICKETT        2,047,223
MOUNTING OF WELLS FOR INDICATING AND RECORDING APPARATUS
Filed Sept. 14, 1934
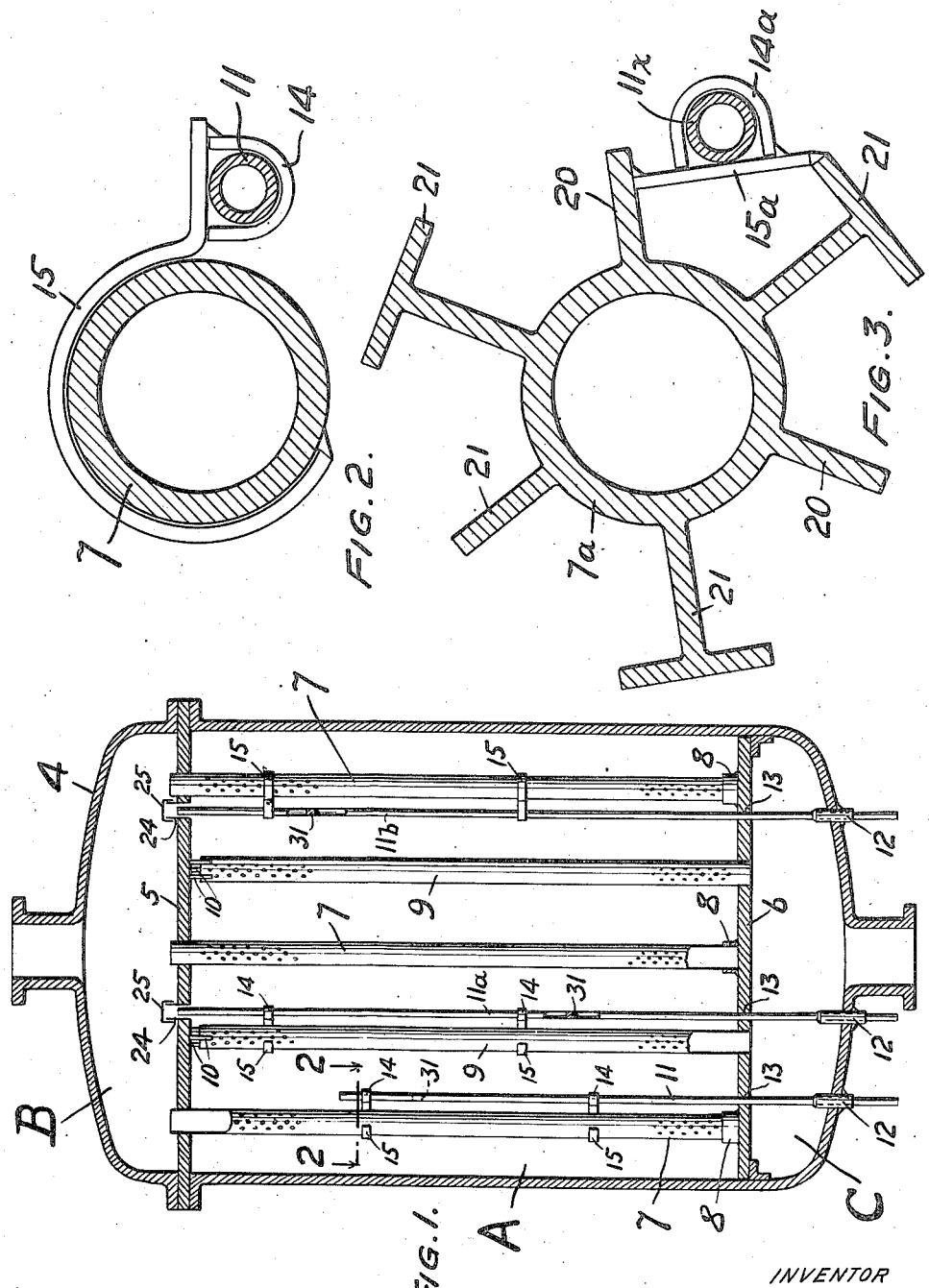
WITNESS:
INVENTOR
Thomas B. Prickett
BY
Ira L. Nickerson
ATTORNEY.

Patented July 14, 1936

2,047,223

UNITED STATES PATENT OFFICE 2,047,223

MOUNTING OF WELLS FOR INDICATING AND RECORDING APPARATUS

Thomas B. Prickett, Woodbury, N. J., assignor to Houdry Process Corporation, Dover, Del., a corporation of Delaware Application September 14, 1934, Serial No. 743,960

3 Claims. (Cl. 23—288)

This invention relates to apparatus for effecting physical or chemical changes. It has direct application to hollow vessels providing chambers adapted to contain gases, vapors, liquids, solids, or any of them, for the purpose of heating, cooling, diluting, concentrating, mixing, combining or chemically transforming any of the substances therein. More specifically, it concerns temperature and other recording or indicating equipment used within or in connection with such chambers, especially when the latter have conduits for fluid extending therewithin.

One object of the invention is to mount recording or indicating apparatus or the impulse generating portions thereof in predetermined positions. Another object is adequately to support the apparatus in such positions. Another object is to provide for removal of the apparatus for repair or replacement. Still another object is to so locate the apparatus that the recordings will not be distorted by irrelevant factors and conditions. Still further objects will be apparent from the detailed description which follows.

The invention involves the mounting within chemical converters, heat exchangers and the like of enclosures or wells which preferably take the form of small conduits or pipes and in which indicating or recording devices, parts thereof, or adjuncts thereto may be mounted. The enclosures are fixedly mounted in definite predetermined positions but arranged for removal and replacement. When mounted in reaction chambers traversed by fluid conduits (plain or finned) used for heat exchange, or distribution or removal of fluids, the enclosures or wells are supported by and in definite relation to such conduits.

One application and use of the invention is disclosed in the accompanying drawing, in which:

Fig. 1 is a vertical section view through a vessel providing a heat exchange and reaction chamber;

Fig. 2 is a fragmentary transverse section view on an enlarged scale on line 2—2 of Fig. 1; and Fig. 3 is a sectional view similar to Fig. 2 showing a modification.

The invention is disclosed in Fig. 1 as embodied in a hollow vessel or converter 4, the interior of which is divided by upper and lower partitions 5 and 6, respectively, into a large central chamber A and smaller end chambers B and C. Either end chamber may be utilized as an inlet for fluids to be physically or chemically modified or transformed in central chamber A, while the other end chamber is used as an outlet for the products issuing from chamber A. For this purpose partitions 5 and 6 have openings or perforations therethrough for the direct passage of fluids or in which conduits may be mounted to extend into or to traverse chamber A. In the form shown, one series of conduits 7 is mounted in partition 5 to open into chamber B and having their lower ends received in guide sleeves 8 on the upper face of partition 6. A second series of conduits 9 is mounted on partition 6 to open into chamber C, while their upper ends are guided and positioned by prongs or posts 10 depending from the lower face of partition 5. While central chamber A is shown empty it may be completely or partly filled by a contact mass (not shown) comprising material which is merely inert, or which has selective adsorptive or catalytic properties, or which takes a direct part in the reaction.

Conduits 7 and 9 may be of any known or desired form arranged in any desired manner. For example, they may comprise either single pipes or double pipes formed as nested elements. They may be plain on their exteriors, as indicated in Figs. 1 and 2, or may have any desired arrangement of projecting members or fins (as indicated in Fig. 3) for the purpose of promoting heat exchange, or effecting better distribution of fluids, or both. If conduits 7 and 9 are for heat exchange only, they will be imperforate; if for distribution of fluids or removal of products, they will be perforated, preferably uniformly throughout their lengths to produce substantially uniform effects or results throughout reaction chamber A. Both series of conduits may be omitted, if straight through end-to-end movement of fluids is desired, in which case partitions 5 and 6 would be in the form of grids or screens. In certain cases where uniform parallel movement of fluids in localized areas of about the same size is not desirable, only one series of conduits (either 7 or 9) would be used.

Referring now to the mounting of indicating and recording means, to which the invention directly relates, enclosures in the form of pipes of small diameter such as 11, 11a and 11b (Fig. 1) extend within the reaction chamber A as wells for thermocouples and other recording or indicating apparatus. The pipes or wells as shown extend from the exterior of the vessel 4 through one end wall thereof, across the adjacent manifolding chamber and the partition which limits the latter into the reaction chamber. In the present instance the pipes or wells pass through fluid-tight packings in sleeves 12 in the lower end wall of converter 4 and through ports 13 in partition 6 with a close sliding fit, and thence into chamber A.

Suitable retaining and positioning guides 14 are provided within chamber A for the pipes or wells. As indicated in Figs. 1 and 2 guides 14 form with supporting arms 15 yokes which loosely receive the pipes or wells. By preference, at least two guides 14 in spaced relation are provided for each pipe, the arms 15 of the guides being attached in any suitable manner to a support which may be provided for that purpose alone, or conveniently attached to an adjacent conduit of either the 7 or 9 series. With conduits having a plain exterior, arm 15 may partly encircle the same (Figs. 1 and 2) and be attached thereto by welding. If the exterior of the conduit is provided with fins, as after the manner of conduit 7a (Fig. 3) which has axially extending fins comprising alternately arranged short straight fins 20 and long T fins 21, the guide member 14a for pipe or well 11x may form a yoke with supporting arm 15a in the form of a bar bridging the space between two adjoining fins 20 and 21 and attached to both as by welding.

In the case of a short pipe or well such as 11 on the left side of Fig. 1 with a short projection into chamber A and closely spaced guides 14, replacement of the well when necessary is a simple matter. Longer pipes such as 11a and 11b which extend the full depth of chamber A should have their free ends supported in recesses or sockets as indicated in partition 5. For convenience in removing and replacing such long pipes or wells, such recesses preferably take the form of bores in which sleeves 24 may be mounted normally sealed by caps 25. When pipes 11a or 11b are to be replaced, the corresponding cap 25 is removed and a heavy wire or flexible metal rod of adequate length is welded to the end of the pipe. The latter is then pulled or pushed out of vessel 4, the wire being left in the latter extending through the openings and yokes. If the pipe is to be changed, the weld is broken and the wire or rod is thereupon rewelded to a new pipe. In forcing the pipe back into place, the wire or rod directs and conducts it through the bores in the outer shell 4 and in the partitions and through its guide yokes 14.

In order that the impulse generating terminal ends for the indicating and recording apparatus shall be positively positioned in predetermined locations, stops 31 are provided as desired to limit the projection of such ends within each pipe or well 11, 11a and 11b as indicated. Stops 31 are so positioned relative to guide brackets 14, 15 and 14a, 15a as to avoid or to reduce to a minimum interference or variation in the record through conduction of guides, etc.

From the above it will be apparent that by the present invention such apparatus as may be mounted within a pipe or well is adequately supported in place against distortion due to stresses and strains resulting from various factors including temperature changes, pressure or weight of contact masses, etc., that the enclosing pipes or wells can be replaced when necessary without impairing or sacrificing any of the guides and supports for the same, and that the impulse generating ends of the apparatus are continuously maintained exactly in predetermined positions so that distortions of the record are minimized.

It is to be understood that the disclosures of the invention herein made are illustrative rather than limiting and that the invention includes all changes, modifications and adaptations within the scope of the appended claims.

I claim as my invention:

1. A converter having spaced partitions defining a central reaction chamber and adjacent end or manifolding chambers, a series of perforated conduits mounted in each of said partitions and extending toward the other partition, the conduits of both said series being in parallelism with one another and in symmetrical arrangement, hollow members adapted to serve as wells for indicating or recording apparatus extending through one of said partitions from the exterior of the converter, across said reaction chamber and terminating adjacent said other partition, and means giving access to certain of said members through said last named partition.

2. A converter having spaced partitions defining a central reaction chamber and adjacent end or manifolding chambers, a series of perforated conduits mounted in each of said partitions and extending toward the other partition, the conduits of both said series being in parallelism with one another and in symmetrical arrangement, hollow members adapted to serve as wells for indicating or recording apparatus extending through one of said partitions from the exterior of the converter, across said reaction chamber and terminating adjacent said other partition, and spaced guide means for said members on certain of the conduits of one or both of said series, said last named partition providing guide means for certain of said members giving access to the latter from the adjacent end chamber.

3. A converter having spaced partitions defining a central reaction chamber and adjacent end or manifolding chambers, a series of perforated conduits mounted in each of said partitions and extending toward the other partition, the conduits of both said series being in parallelism with one another and in symmetrical arrangement, pipes to serve as wells for indicating or recording apparatus extending from the exterior of the converter through one of said partitions and across said reaction chamber, guide members providing yokes loosely receiving said pipes fixedly mounted on certain of said conduits, the other of said partitions having bores in line with certain of said pipes, guide sleeves in said bores, and caps for sealing said sleeves.

THOMAS B. PRICKETT.